(12) United States Patent
Lahn et al.

(10) Patent No.: US 7,497,207 B2
(45) Date of Patent: Mar. 3, 2009

(54) FUEL TANK AND ASSOCIATED CONTROLLER

(75) Inventors: Bernd-Juergen Lahn, Wegberg (DE); Peter Schreuder, Kevelaer (DE); Matthias Henschel, Rheinmuenster (DE); Rainer Strauss, Moenchengladbach (DE); Dirk Neulen, Dueren (DE); Andreas Winkler, Muehlheim (DE)

(73) Assignee: TI Automotive (Neuss) GmbH, Neuss (DE)

( * ) Notice: Subject to any disclaimer, the term of this patent is extended or adjusted under 35 U.S.C. 154(b) by 430 days.

(21) Appl. No.: 11/330,462

(22) Filed: Jan. 12, 2006

(65) Prior Publication Data
US 2006/0162702 A1     Jul. 27, 2006

(30) Foreign Application Priority Data
Jan. 21, 2005    (DE) ................. 10 2005 002 893

(51) Int. Cl.
*F02M 37/10*    (2006.01)
(52) U.S. Cl. ..................... 123/497; 123/509
(58) Field of Classification Search ............. 123/509, 123/497, 514, 41.31; 417/366
See application file for complete search history.

(56) References Cited

U.S. PATENT DOCUMENTS

| 4,763,611 | A | * | 8/1988 | Kobayashi et al. ....... 123/41.31 |
| 4,811,709 | A | * | 3/1989 | Braun et al. ................. 123/357 |
| 4,869,218 | A | * | 9/1989 | Fehlmann et al. ........... 123/357 |
| 4,926,829 | A | * | 5/1990 | Tuckey ....................... 123/497 |
| 5,038,741 | A | * | 8/1991 | Tuckey ....................... 123/509 |
| 5,075,822 | A | * | 12/1991 | Baumler et al. ............. 361/710 |
| 5,454,697 | A | * | 10/1995 | Nakanishi ................ 417/423.3 |
| 5,613,844 | A | * | 3/1997 | Tuckey et al. ............... 417/366 |
| 6,600,653 | B2 | * | 7/2003 | Koike et al. ................. 361/704 |
| 6,661,339 | B2 | | 12/2003 | Muirhead |
| 6,745,823 | B2 | * | 6/2004 | Brost ........................ 165/80.4 |
| 6,877,488 | B2 | * | 4/2005 | Washeleski et al. ......... 123/497 |
| 2005/0237184 | A1 | | 10/2005 | Muirhead |
| 2005/0241548 | A1 | | 11/2005 | Muirhead |

FOREIGN PATENT DOCUMENTS

WO    WO 03/102405    12/2003

\* cited by examiner

*Primary Examiner*—Stephen K Cronin
*Assistant Examiner*—Arnold Castro
(74) *Attorney, Agent, or Firm*—Reising, Ethington, Barnes, Kisselle, P.C.

(57) ABSTRACT

A vehicle fuel system having a fuel tank with an opening with a closure disposed adjacent a vehicle component with a service access opening and closure adjacent the tank closure, and an electronic controller carried by the vehicle component closure. At least one electrical device in the tank is connected by an electric wire to the controller. Preferably, a thermal protector is carried by the closure and arranged as a metal heat sink for the controller and dissipates heat to the atmosphere.

20 Claims, 1 Drawing Sheet

7,497,207 B2

FUEL TANK AND ASSOCIATED CONTROLLER

CROSS-REFERENCE TO RELATED APPLICATION

Applicants claim priority of German Application, Ser. No. 10 2005 002 893.4, filed Jan. 21, 2005.

FIELD OF THE INVENTION

This invention relates generally to automotive fuel systems, and more particularly to fuel tanks and controllers of automotive fuel systems.

BACKGROUND OF THE INVENTION

A fuel tank of a vehicle usually includes an opening through which various electrical devices are installed including a fuel pump, valves, and a fuel level sensor. The electrical devices are monitored and controlled by an electronic controller electrically connected to the devices by wiring. The controller is located outside the fuel tank, such as in a distant engine compartment of the vehicle.

Unfortunately, however, some controllers generate undesirable electromagnetically-radiated emissions, which are amplified by a long run of wiring between a controller and associated electrical devices. Therefore, controllers may be carried by the fuel tank at a location nearer the electrical devices in the fuel tank. But many controllers tend to generate heat, which is incompatible with the relatively soft plastic material of the fuel tank.

For example, from International Patent Publication Number WO 03/102405 A2, it is known to integrate a control module into a fuel tank closure or cap assembly, which seals a service opening of a fuel tank. Because vehicle fuel tanks are normally composed of plastic, such an arrangement involves a possibility that the control module and/or individual components thereof may overheat, thereby resulting in melting of the fuel tank plastic.

SUMMARY OF THE INVENTION

According to one form of the invention, a vehicle includes a vehicle component and a fuel tank disposed adjacent the vehicle component. The vehicle component has a component opening and a component closure covering the component opening. The fuel tank has a fuel tank opening adjacent the component opening and a fuel tank closure covering the fuel tank opening. The vehicle further includes at least one electrical device disposed within the fuel tank, and an electronic controller disposed outside of the fuel tank and carried by the component closure of the vehicle component. The controller is electrically connected to the at least one electrical device by wiring, and is arranged for electrical connection to other electrical devices located outside the fuel tank.

According to another form of the invention, a fuel system for a vehicle includes a fuel tank, which is disposed adjacent a vehicle component. The vehicle component includes a component opening and a component closure covering the component opening. The fuel tank includes a fuel tank opening adjacent the component opening and a fuel tank closure covering the fuel tank opening. The fuel system further includes an electronic controller disposed outside of the fuel tank and carried by the component closure of the vehicle component.

According to a further form of the invention, a closure assembly closes an opening in a vehicle component positioned adjacent a fuel tank. The closure assembly includes a closure and an electronic controller carried by the closure. According to preferred aspects of this form of the invention, the closure assembly further includes a thermal protector carried by the closure and arranged as a metal heat sink for the controller, and at least one electrical connector in electrical communication with the electronic controller and extending through the closure, which may be composed of plastic.

At least some of the objects, features and advantages that may be achieved by at least certain embodiments of the invention include providing a fuel tank system with a controller and fuel tank configuration that yields improvements in performance of electromagnetic compatibility (EMC) of the system; does not compromise the integrity of the material of a fuel tank or closures associated therewith; is of relatively simple design and economical manufacture and assembly, is rugged, durable, reliable and in service has a long useful life.

Of course, other objects, features and advantages will be apparent in view of this disclosure to those skilled in the art. Various other vehicles, fuel systems, or closure assemblies embodying the invention may achieve more or less than the noted objects, features or advantages.

BRIEF DESCRIPTION OF THE DRAWINGS

These and other objects, features and advantages of the present invention will be apparent from the following detailed description of the preferred embodiments and best mode, appended claims, and accompanying drawings in which:

DETAILED DESCRIPTION OF THE PREFERRED EMBODIMENTS

Figure 1:
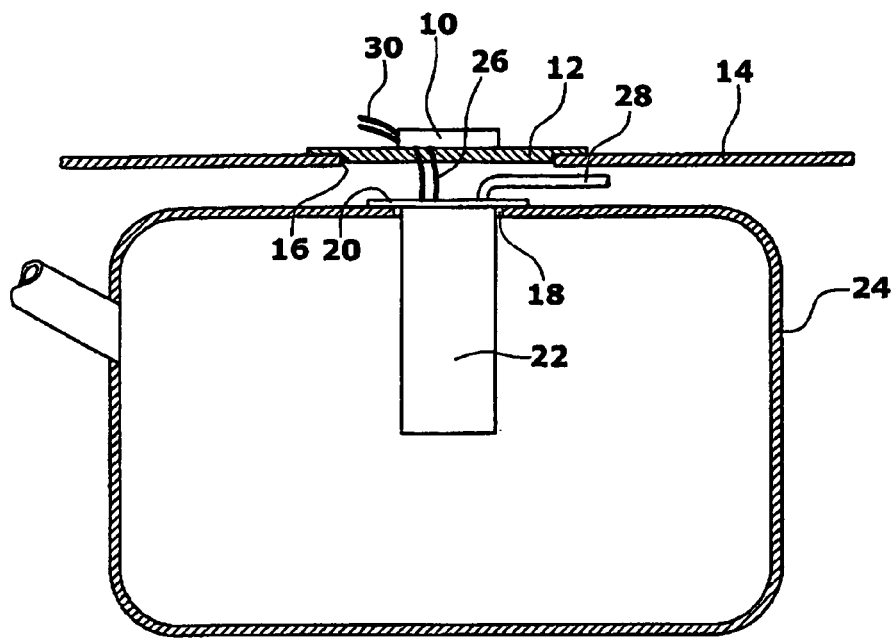
FIG. 1 is a schematic side view of a presently preferred form of a fuel system including a controller carried by a vehicle component and spaced away from an outside surface of a fuel tank.

Referring in more detail to the drawings, FIG. 1 illustrates a fuel system for a vehicle including a fuel tank 24 located beneath or adjacent a vehicle component 14, such as a body member of the vehicle or any other suitable component. The fuel tank 24 includes various electrical devices 22 schematically shown and including, for example, a fuel pump, a level gauge, valves, sensors, and the like inserted through a service opening 18 in the fuel tank 24 and placed in any suitable location in the tank 24. A tank closure 20 is attached to the fuel tank 24 in any suitable manner to cover the tank service opening 18, and preferably carries the electrical devices 22 thereon and a fuel line 28 therethrough that communicates with the interior of the fuel tank 24 and extends outside thereof.

The fuel system also includes a closure assembly including a controller 10 carried by a closure 12 of the vehicle component 14. The closure assembly covers an access opening 16 in the vehicle component 14 adjacent the tank service opening 18 and tank closure 20. The closure 12 may be composed of metal, plastic, or any other suitable material and attached to the vehicle component 14 in any suitable manner. The fuel system further includes electrical wiring 26 extending through the tank closure 20. The electrical wiring 26 connects the controller 10 to the electrical devices 22 arranged inside the tank 24. Moreover, the controller 10 may be electrically connected to external electrical devices including power supplies by external electrical wiring 30 such as wires, a wiring harness or tree, or the like.

Figure 2:
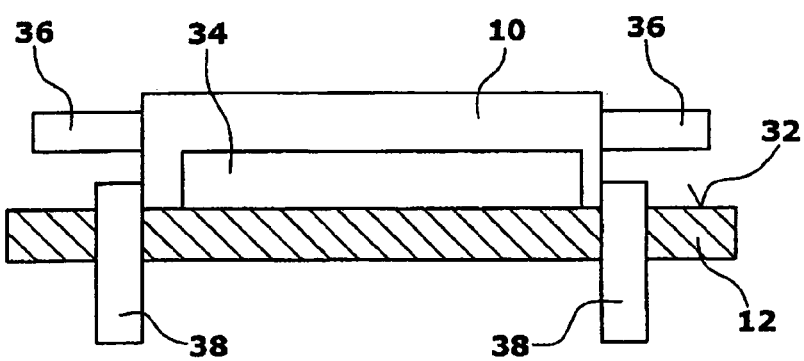
FIG. 2 is a schematic diagram of another form of a controller carried on a closure of a vehicle component.

FIG. 2 illustrates a portion of a preferred form of the fuel system wherein the controller 10 is arranged on a top or outside surface 32 of the closure 12, i.e. on a side of the closure 12 opposite that of the fuel tank 24. A thermal protector 34 is arranged between the controller 10 and the closure 12. The thermal protector 34 prevents any overheating of the controller 10 from damaging the fuel tank 24, particularly where the fuel tank 24 is composed of plastic. The thermal protector 34 may be a layer of thermal insulation or any other suitable arrangement of insulation material. Preferably, the thermal protector 34 is composed of a material offering good heat conductivity and good form stability at vehicle temperatures. For example, the thermal protector 34 may be composed of a heat conductive metal and is preferably arranged to act as a heat sink and dissipater for the controller 10. In this way, any heat produced by the controller 10 is rapidly conducted away from the controller 10 and dissipated to the atmosphere due to a cooling effect of the thermal protector 34.

Referring to FIGS. 1 and 2, a first set of electrical connectors 36 are provided for connecting the controller 10 to the electrical wiring 30. A second set of electrical connectors 38 extend through the closure 12 and are provided for connecting the controller 10 with the electrical devices 22 via the electrical wiring 26 extending through the tank closure 20. The electrical connectors 36, 38 may be plugs, sockets, or the like which may be directly connected with the controller 10, or may be connected to the controller 10 via multi-connector cables (not shown).

Figure 3:
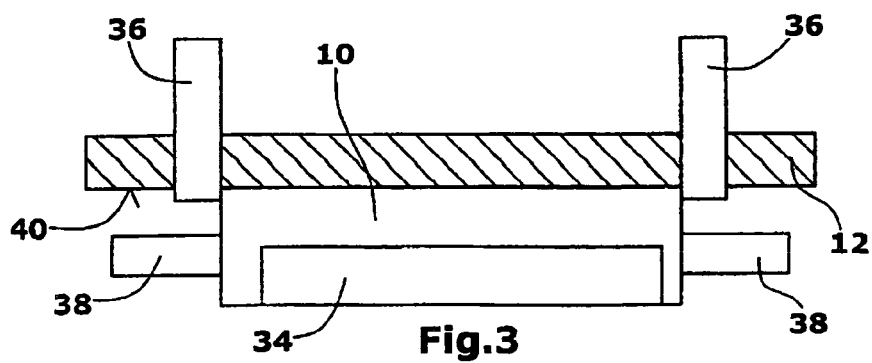
FIG. 3 is schematic diagram of a further form of a controller carried under a closure of a vehicle component.

FIG. 3 illustrates a portion of another preferred form of the fuel system wherein the controller 10 is arranged on an underside, bottom or inside surface 40, of the closure 12, i.e. on a side of the closure 12 facing the fuel tank 24. The thermal protector 34 is disposed between the controller 10 and the fuel tank 24.

Referring to FIGS. 1 and 3, the first set of electrical connectors 36 extends through the closure 12 and connects the controller 10 to the electrical wiring 30. The second set of electrical connectors 38 connect the controller 10 with the electrical devices 22 via the electrical wiring 26 extending through the tank closure 20.

The fuel tank and controller configurations described above enable the controller 10 to be located close enough to the fuel tank 24 to alleviate electromagnetic emissions problems, but not so close as to thermally adversely affect the fuel tank 24. First, compared to prior art arrangements, the arrangement of a controller on a closure member of a vehicle component adjacent a fuel tank effectively shortens the length of electrical lines extending from the controller to devices inside the tank. Accordingly, the described configurations yield improvements in performance of electromagnetic compatibility (EMC), which is the ability of electronic equipment to function satisfactorily without generating intolerable electromagnetic disturbance to other electronics. Second, arrangement of a controller on a vehicle component closure member adjacent a fuel tank ensures that the controller is disposed at a given distance from the fuel tank. Consequently, even hot or overheated components of the controller do not cause the fuel tank to melt, or otherwise become distorted or damaged.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Moreover, directional words such as top, bottom, upper, lower, radial, circumferential, axial, lateral, longitudinal, vertical, horizontal, and the like are employed by way of description and not limitation. Other terms are to be construed using their broadest reasonable meaning unless they are used in a context that requires a different interpretation. When introducing elements of the present invention or the embodiments thereof, the articles "a," "an," "the," and "said" are intended to mean that there are one or more of the elements.

It is to be understood that the invention is not limited to the particular exemplary embodiments disclosed herein, but rather is defined by the following claims. In other words, the statements contained in the foregoing description relate to particular exemplary embodiments and are not to be construed as limitations on the scope of the invention as claimed below or on the definition of terms used in the claims, except where a term or phrase is expressly defined above.

Although the present invention has been disclosed in conjunction with a limited number of presently preferred exemplary embodiments and forms, many others are possible and it is not intended herein to mention all of the possible equivalent embodiments, forms and ramifications of the present invention. Other modifications, variations, forms, ramifications, substitutions, and/or equivalents will become apparent or readily suggest themselves to persons of ordinary skill in the art in view of the foregoing description. In other words, the teachings of the present invention encompass many reasonable substitutions or equivalents of limitations recited in the following claims. As just one example, the disclosed structure, materials, sizes, shapes, and the like could be readily modified or substituted with other similar structure, materials, sizes, shapes, and the like. Indeed, the present invention is intended to embrace all such forms, ramifications, modifications, variations, substitutions, and/or equivalents as fall within the spirit and broad scope of the following claims.

What is claimed is:

1. A closure assembly covering an opening in a vehicle component positioned adjacent a fuel tank, comprising:
    a vehicle component closure constructed for covering the vehicle component opening adjacent to and spaced away from the fuel tank; and
    an electronic controller carried by the closure and disposed outside of and spaced away from the fuel tank.

2. The closure assembly of claim 1, further comprising at least one electrical connector in electrical communication with the electronic controller and extending through the closure.

3. The closure assembly of claim 2, further comprising at least one other electrical connector in electrical communication with the electronic controller.

4. The closure assembly of claim 1, wherein the closure has an outside surface on which the controller is carried.

5. The closure assembly of claim 1, wherein the closure has an inside surface on which the controller is carried.

6. The closure assembly of claim 1 further comprising a thermal protector carried by the closure.

7. The closure assembly of claim 6 wherein the thermal protector is composed of metal.

8. The closure assembly of claim 6 wherein the thermal protector is disposed between the closure and the controller.

9. The closure assembly of claim 6 wherein the controller is disposed between the closure and the thermal protector.

10. The closure assembly of claim 1 wherein the closure is at least partially composed of plastic and the closure assembly further comprises:
   at least one electrical connector in electrical communication with the controller and extending through the closure; and
   a thermal protector carried by the closure and arranged as a metal heat sink for the controller.

11. A fuel system for a vehicle including a vehicle component having a component opening and a component closure covering the component opening, comprising:
   a fuel tank disposed adjacent to and spaced away from the vehicle component and having a fuel tank opening adjacent the component opening and a fuel tank closure covering the fuel tank opening; and
   an electronic controller disposed outside of and spaced away from the fuel tank and carried by the component closure of the vehicle component.

12. The fuel system of claim 11, further comprising electrical connectors in electrical communication with the electronic controller and at least one of which extends through the closure.

13. The fuel system of claim 11, wherein the closure has an outside surface on which the controller is carried.

14. The fuel system of claim 11, wherein the closure has an inside surface on which the controller is carried.

15. The fuel system of claim 11 further comprising a thermal protector carried by the closure.

16. The fuel system of claim 15 wherein the thermal protector is disposed between the closure and the controller.

17. The fuel system of claim 15 wherein the controller is disposed between the closure and the thermal protector.

18. The fuel system of claim 11 wherein the closure is composed at least partially of plastic.

19. The fuel system of claim 11 wherein the closure is at least partially composed of plastic and the fuel system further comprises:
   at least one electrical connector in electrical communication with the controller and extending through the closure; and
   a thermal protector carried by the closure and arranged as a metal heat sink for the controller.

20. A vehicle fuel system comprising:
   a vehicle component having a component opening;
   a component closure covering the component opening;
   a fuel tank disposed adjacent to and spaced away from the vehicle component and having a fuel tank opening adjacent the component opening;
   a fuel tank closure covering the fuel tank opening;
   at least one electrical device disposed within the fuel tank; and
   an electronic controller disposed outside of and spaced away from the fuel tank and carried by the component closure of the vehicle component, and being electrically connected to the at least one electrical device by wiring, and being arranged for electrical connection to other electrical devices located externally of the fuel tank.

\* \* \* \* \*